(12) United States Patent
Cox

(10) Patent No.: US 11,194,948 B2
(45) Date of Patent: Dec. 7, 2021

(54) SYSTEM, METHOD, APPARATUS, AND COMPUTER PROGRAM PRODUCT FOR GENERATING A CABLING PLAN FOR A COMPUTING SYSTEM

(71) Applicant: VCE Company, LLC, Richardson, TX (US)

(72) Inventor: Timothy Allen Cox, Bellingham, MA (US)

(73) Assignee: EMC IP Holding Company LLC, Round Rock, TX (US)

( * ) Notice: Subject to any disclaimer, the term of this patent is extended or adjusted under 35 U.S.C. 154(b) by 1444 days.

(21) Appl. No.: 14/460,713

(22) Filed: Aug. 15, 2014

(65) Prior Publication Data
US 2016/0048610 A1    Feb. 18, 2016

(51) Int. Cl.
| | |
|---|---|
| *G06F 30/394* | (2020.01) |
| *H04Q 1/02* | (2006.01) |
| *H04Q 1/06* | (2006.01) |
| *G06F 30/18* | (2020.01) |
| *G06F 30/39* | (2020.01) |
| *G06F 111/20* | (2020.01) |
| *G06F 113/16* | (2020.01) |

(52) U.S. Cl.
CPC ............ *G06F 30/394* (2020.01); *G06F 30/18* (2020.01); *G06F 30/39* (2020.01); *H04Q 1/02* (2013.01); *H04Q 1/06* (2013.01); *H04Q 1/13* (2013.01); *G06F 2111/20* (2020.01); *G06F 2113/16* (2020.01)

(58) Field of Classification Search
None
See application file for complete search history.

(56) References Cited

U.S. PATENT DOCUMENTS

| | | | |
|---|---|---|---|
| 7,996,190 B2 | 8/2011 | Rodriguez et al. | |
| 8,190,790 B1 * | 5/2012 | Ogawa | H04L 45/02 370/252 |
| 8,225,250 B2 | 7/2012 | Yamazaki et al. | |

(Continued)

OTHER PUBLICATIONS

International Search Report and the Written Opinion of the International Searching Authority, PCT/US2015/043265, dated Dec. 14, 2015.

*Primary Examiner* — Doon Y Chow
*Assistant Examiner* — Phuong N Hoang
(74) *Attorney, Agent, or Firm* — Womble Bond Dickinson (US) LLP

(57) ABSTRACT

A system, method, apparatus, and computer program product for generating a cabling plan for a computing system are disclosed. A method may include accessing an elevation plan defining a respective mount position for each of a set of components of the computing system. The method may also include determining one or more port pairs to be used for interconnecting the plurality of components. The method may further include determining, for each port pair, a cable length to use to connect the port pair. The cable length may be determined based at least in part on mount positions defined by the elevation plan for the two components connected by the port pair. The method may additionally include generating a cabling plan defining the cable length to use to connect each respective port pair.

6 Claims, 9 Drawing Sheets

(56) References Cited

U.S. PATENT DOCUMENTS

| | | | |
|---|---|---|---|
| 2007/0136031 A1* | 6/2007 | Feldman | G06F 17/50 |
| | | | 703/1 |
| 2008/0148081 A1* | 6/2008 | Diab | H04L 12/10 |
| | | | 713/320 |
| 2008/0170509 A1* | 7/2008 | Diab | H04B 3/487 |
| | | | 370/252 |
| 2009/0265318 A1* | 10/2009 | Vermeulen | H04L 41/00 |
| 2010/0057393 A1* | 3/2010 | Einsweiler | G06F 11/2221 |
| | | | 702/108 |
| 2012/0234778 A1* | 9/2012 | Anderson | G02B 6/4452 |
| | | | 211/26.2 |
| 2014/0067339 A1 | 3/2014 | Razafinjatovo et al. | |

* cited by examiner

| CAB SN | 1 (502) | | CAB SN | 2 (504) | |
|---|---|---|---|---|---|
| RU42 | PATCH PANEL (R) A | | RU42 | PATCH PANEL (R) B | |
| RU41 | | | RU41 | | |
| RU40 | | | RU40 | | |
| RU39 | | | RU39 | | |
| RU38 | | | RU38 | | |
| RU37 | 3048 A | | RU37 | 3048 B | |
| RU36 | | | RU36 | | |
| RU35 | AMP-2 C220 A | | RU35 | AMP-2 C220 B | |
| RU34 | | | RU34 | | |
| RU33 | | | RU33 | | |
| RU32 | 5548 I | | RU32 | 5548 J | |
| RU31 | 5548 G | | RU31 | 5548 H | |
| RU30 | 2U PASSTHROUGH | | RU30 | 2U PASSTHROUGH | |
| RU29 | | | RU29 | | |
| RU28 | 5548 E | | RU28 | 5548 F | |
| RU27 | 5548 C | | RU27 | 5548 D | |
| RU26 | | | RU26 | | |
| RU25 | | | RU25 | | |
| RU24 | | | RU24 | | |
| RU23 | | | RU23 | | |
| RU22 | | | RU22 | | |
| RU21 | | | RU21 | | |
| RU20 | | | RU20 | | |
| RU19 | | | RU19 | | |
| RU18 | | | RU18 | | |
| RU17 | 2U PASSTHROUGH | | RU17 | 2U PASSTHROUGH | |
| RU16 | | | RU16 | | |
| RU15 | 6296 A | | RU15 | 6296 B | |
| RU14 | | | RU14 | | |
| RU13 | | | RU13 | | |
| RU12 | | | RU12 | | |
| RU11 | | | RU11 | | |
| RU10 | 5108 C | | RU10 | 5108 D | |
| RU9 | | | RU9 | | |
| RU8 | | | RU8 | | |
| RU7 | | | RU7 | | |
| RU6 | | | RU6 | | |
| RU5 | | | RU5 | | |
| RU4 | 5108 A | | RU4 | 5108 B | |
| RU3 | | | RU3 | | |
| RU2 | | | RU2 | | |
| RU1 | | | RU1 | | |

FIG. 5

SYSTEM, METHOD, APPARATUS, AND COMPUTER PROGRAM PRODUCT FOR GENERATING A CABLING PLAN FOR A COMPUTING SYSTEM

FIELD OF THE DISCLOSURE

Aspects of the disclosure relate to computing system design and, more particularly, to a system, method, apparatus, and computer program product for generating a cabling plan for a computing system.

BACKGROUND

Converged infrastructure computing is rapidly gaining in popularity, as more and more entities deploying IT platforms are choosing to deploy converged infrastructure systems as part of an integrated information technology (IT) solution. In this regard, converged infrastructure packages multiple IT components, such as servers, data storage devices, networking equipment, and software for IT infrastructure management into a single, optimized computing solution. The integrated solution provided by a converged infrastructure can reduce complexity of deployment, increase IT infrastructure reliability, and reduce management costs compared to conventional IP platforms assembled from individually acquired and assembled components and software packages, as converged infrastructure can provide an integrated set of components selected and assembled by a single vendor into an integrated platform providing guaranteed component interoperability and software compliance. Moreover, converged infrastructure can provide an integrated pool of computing, storage, and networking resources (e.g., a cloud-based computing model) that can be shared by multiple applications and/or users.

However, given the diverse mix of components included in converged infrastructure computing systems, design specification for component placement within one or more racks that can be used to house the components of a converged infrastructure can be complex. As the set of components included in converged infrastructures and other computing systems including a mix of components is often customized specifically for a given customer's needs, the burden of system design is generally incurred for each individual computer system such that there is little reduction in design burden through economies of scale. Moreover, once a design specification has been completed, there is a need to generate documentation usable by individuals tasked with building a computing system in accordance with the design specification (e.g., contract integrators) to complete the system build in accordance with the design specification.

SUMMARY

A system, method, apparatus, and computer program product for generating a cabling plan for a computing system, such as a converged infrastructure, are disclosed. For example, a method in accordance with some embodiments may include accessing an elevation plan defining a respective mount position for each of a plurality of components of the computing system within one or more racks. The method may also include determining one or more port pairs to be used for interconnecting the plurality of components. The method may further include determining, for each port pair of the one or more port pairs, a cable length to use to connect the pair of ports in the port pair. The cable length may be determined based at least in part on mount positions defined by the elevation plan for the two components connected by the port pair. The method may additionally include generating a cabling plan defining, for each port pair of the one or more port pairs, the cable length to use to connect the pair of ports in the port pair. In accordance with some example embodiments, the cabling plan may be automatically generated without human intervention in accordance with the method.

It will be appreciated that the above Summary is provided merely for purposes of summarizing some example embodiments so as to provide a basic understanding of some aspects of the disclosure. As such, it will be appreciated that the above described example embodiments are merely examples of some embodiments and should not be construed to narrow the scope or spirit of the disclosure in any way. It will be appreciated that the scope of the disclosure encompasses many potential embodiments, some of which will be further described below, in addition to those here summarized. Further, other aspects and advantages of embodiments disclosed herein will become apparent from the following detailed description taken in conjunction with the accompanying drawings which illustrate, by way of example, the principles of the described embodiments.

BRIEF DESCRIPTION OF THE DRAWINGS

Figure 1:
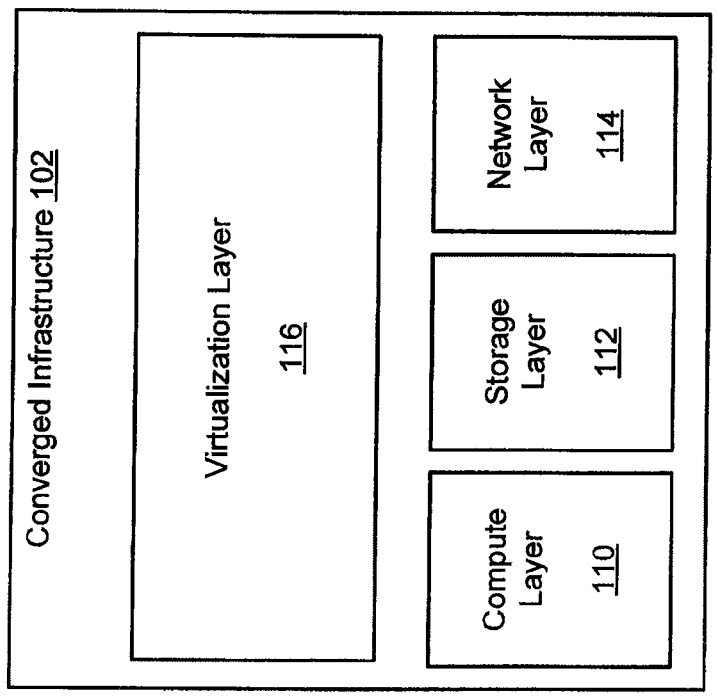
Figure 2:
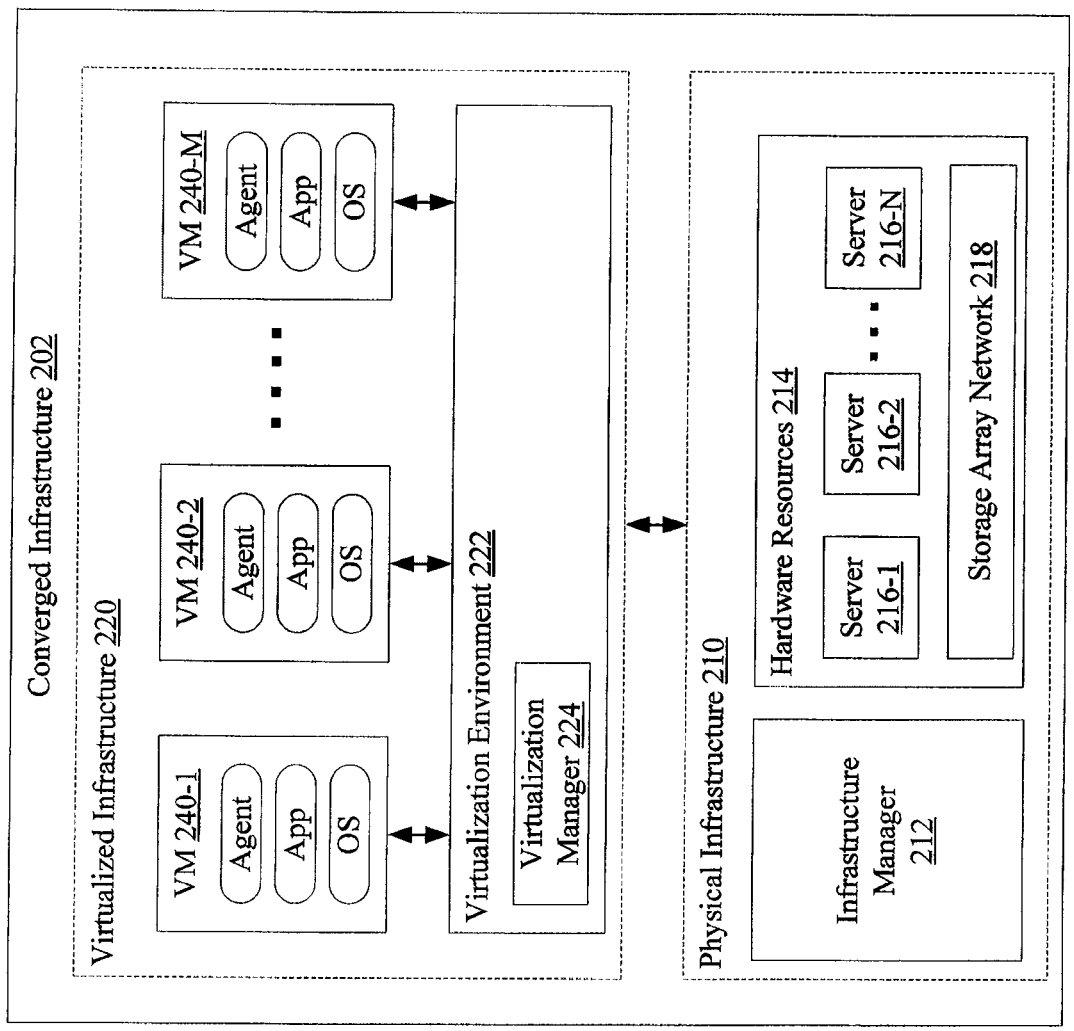
Figure 3:
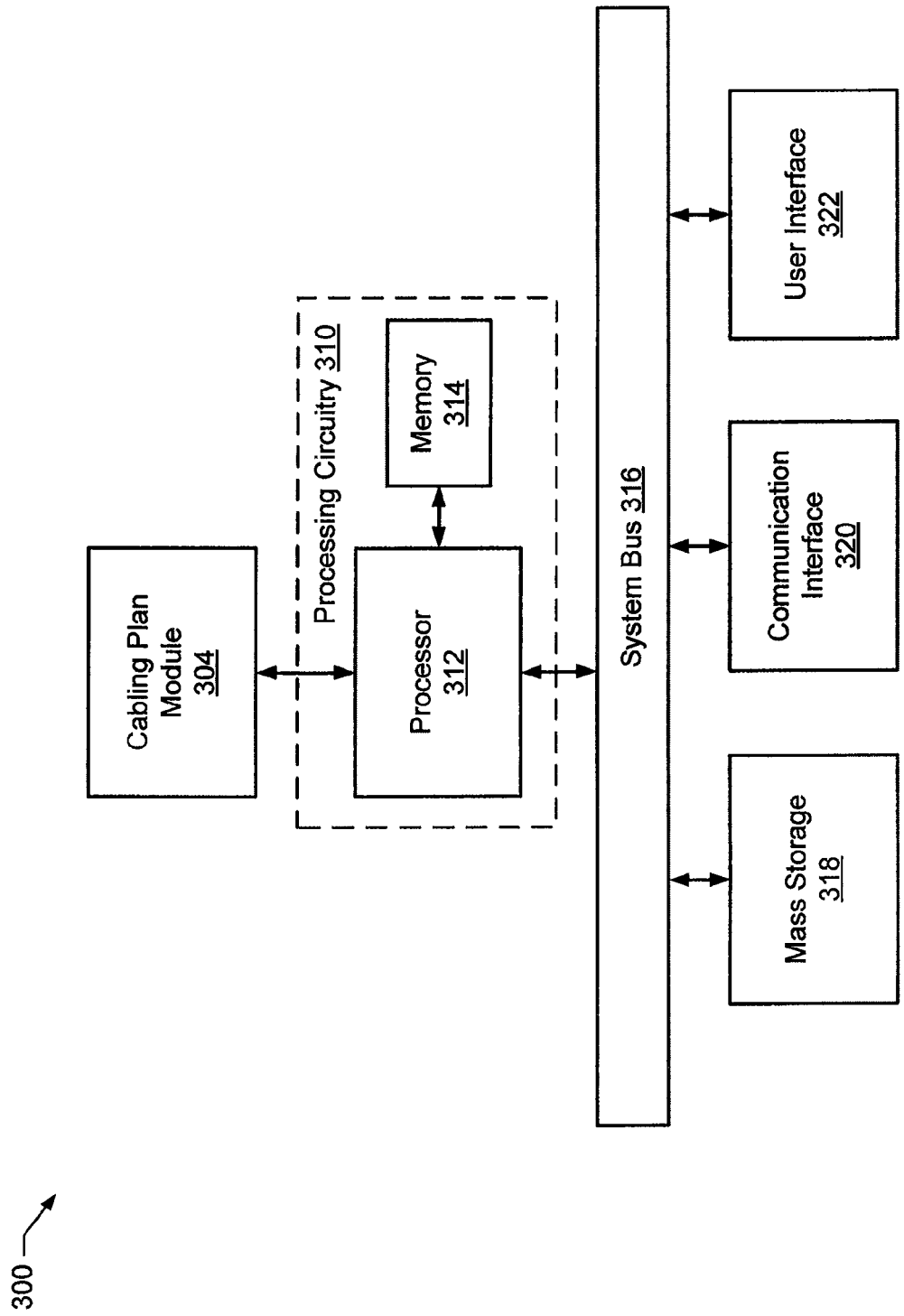
Figure 4:
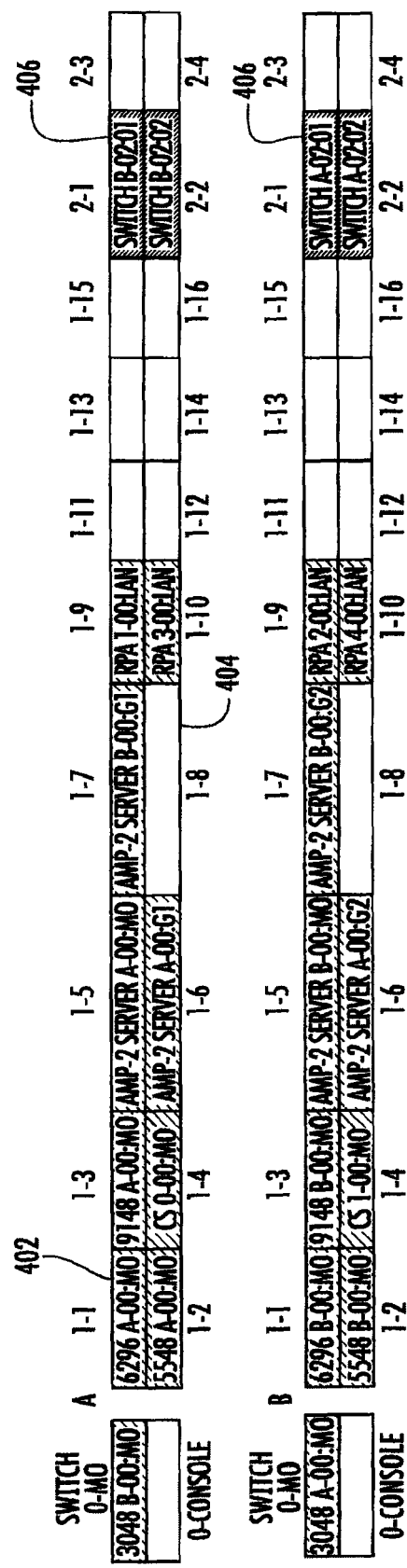
Figure 6:
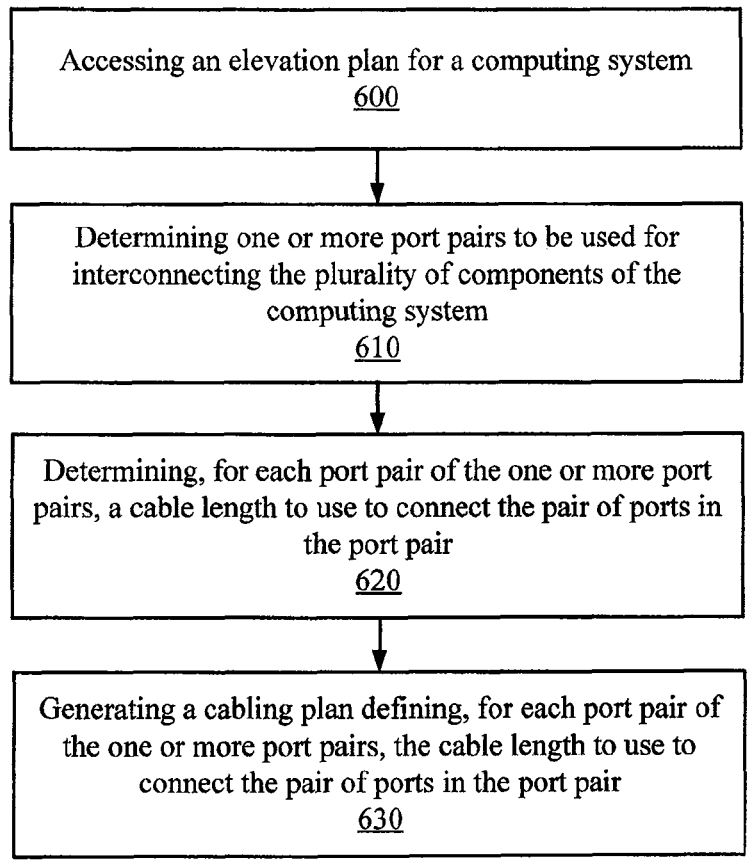
Figure 7:
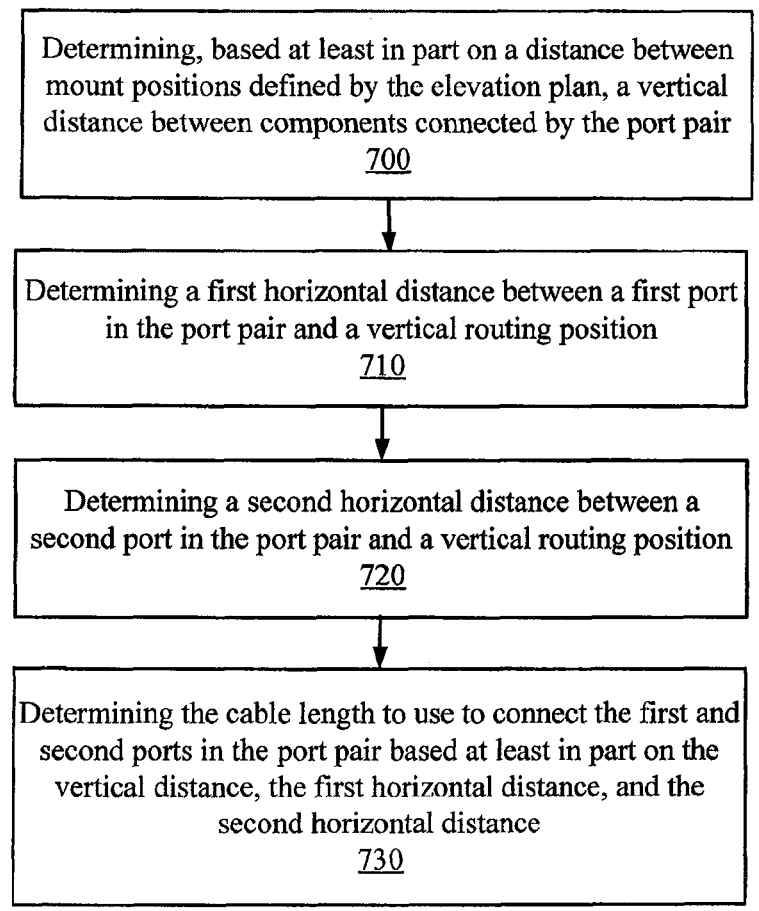
Figure 8:
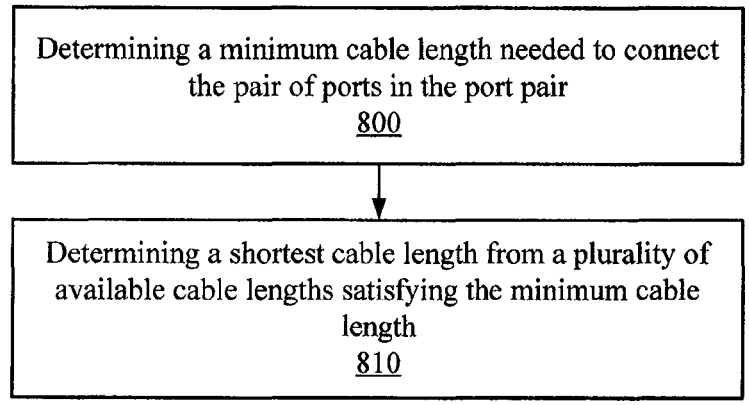
Figure 9:
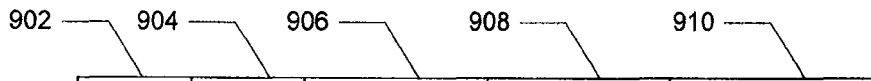

Having thus described the disclosure in general terms, reference will now be made to the accompanying drawings, which are not necessarily drawn to scale, and wherein:

FIG. 1 illustrates a block diagram of an architecture of an example converged infrastructure in accordance with some example embodiments;

FIG. 2 illustrates a block diagram of an architecture of another example converged infrastructure in accordance with some example embodiments;

FIG. 3 illustrates a block diagram of an example computing system that may be configured to generate a cabling plan in accordance with some example embodiments;

FIG. 4 illustrates an example port map defining port pairs to be used for interconnecting components of a computing system that may be used to facilitate generation of a cabling plan in accordance with some example embodiments;

FIG. 5 illustrates an example elevation plan that may be used to facilitate generation of a cabling plan in accordance with some example embodiments;

FIG. 6 illustrates a flowchart according to an example method for generating a cabling plan for a computing system in accordance with some example embodiments;

FIG. 7 illustrates a flowchart according to an example method for determining a length of cable needed to connect a port pair in accordance with some example embodiments;

FIG. 8 illustrates a flowchart according to an example method for determining a length of cable to use to connect a port pair in accordance with some example embodiments; and FIG. 9 illustrates a portion of an example cabling plan that may be generated in accordance with some example embodiments.

DETAILED DESCRIPTION

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

Embodiments disclosed herein relate to the generation of an cabling plan for a computing system such as a converged infrastructure that includes a plurality of components mounted in one or more racks (e.g., a rack mounted computing system). In this regard, some embodiments disclosed herein provide for automatic generation of a cabling plan specifying the cables to use to connect one or more port pairs that may be used to interconnect components of the computing system. For example, some example embodiments may be configured to use an elevation plan defining component mount positions for components of the computing system and a specification for the port pairs to be used to interconnect the components of the computing system to determine the set of cables (e.g., the cable lengths and/or types) to use to interconnect the components of the computing system and to generate a cabling plan defining the cables to use to interconnect the components of the computing system and how to interconnect the components. The cabling plan may, for example, used by an individual, such as a contract integrator, as a guideline for building the computing system and/or by an owner or other operator of the computing system after build out of the computing system is completed.

FIG. 1 illustrates a block diagram of an architecture of an example converged infrastructure 102 in accordance with some example embodiments. In this regard, FIG. 1 illustrates an example converged infrastructure for which a cabling plan may be generated in accordance with various example embodiments. While some example embodiments are illustrated and described with respect to the generation of a cabling plan for a converged infrastructure, it will be appreciated that various example embodiments may be applied to the generation of a cabling plan for any type of computing system including a plurality of components housed within one or more racks. As such, it will be appreciated that the example embodiments and associated techniques described herein with respect to the generation of a cabling plan for a converged infrastructure may be applied mutatis mutandis to other computing systems that can include a plurality of components.

The converged infrastructure 102 may include a plurality of components, such as servers, data storage devices, network equipment, and associated software, which may collectively form the converged infrastructure 102. By way of non-limiting example, in some embodiments, the converged infrastructure 102 may be implemented by a Vblock™ System available from the VCE Company, LLC of Richardson, Tex. Some example embodiments provide for the generation of a cabling plan for interconnecting the components of the converged infrastructure 102 such that the components may collectively operate to provide functionality of a converged infrastructure.

The converged infrastructure 102 of some embodiments may include one or more compute layer 110 components, such as one or more servers (e.g., blade servers, rack servers, and/or other servers), one or more fabric extenders, one or more fabric interconnects, a chassis, and/or other compute layer components that may be implemented on a converged infrastructure to provide computing and processing resources of the converged infrastructure. The converged infrastructure 102 may further include one or more storage layer 112 components, such as one or more storage arrays and/or other mass storage devices that may be implemented on a converged infrastructure. In some embodiments, the converged infrastructure 102 may additionally include one or more network layer 114 components, such as one or more switches and/or other network layer components that may be implemented on a converged infrastructure. For example, the network layer 114 may include components that provide switching and routing between the compute layer 110 and storage layer 112 within the converged infrastructure 102. The network layer 114 may additionally or alternatively include components that provide switching and routing between the converged infrastructure 102 and a network so as to support network communication between a component (s) of the converged infrastructure 102 and a computing platform(s) independent of the converged infrastructure 102. The components of the compute layer 110, storage layer 112, and network layer 114 may collectively provide a physical infrastructure of the converged infrastructure 102.

The converged infrastructure 102 may additionally include a virtualization layer 116, which may include one or more virtualization components configured to support one or more virtualized computing environments. The components of the virtualization layer 116 may include components embodied in software, hardware, firmware, and/or some combination thereof. For example, the virtualization layer 116 may include a hypervisor and/or other virtualization components that may be configured to create and run virtual machines and/or to otherwise virtually simulate a computing environment. In some example embodiments, the virtualization layer 116 may include and/or may be communicatively coupled with one or more management components configured to support management of the converged infrastructure 102. For example, in some embodiments, the virtualization layer 116 may include a management infrastructure, which may provide management resources for managing the converged infrastructure 102. In some such embodiments, the management infrastructure may be separate system from the converged infrastructure, but may be connected to the converged infrastructure to allow management of the entire converged infrastructure 102. In some example embodiments, the virtualization layer 116 may utilize physical hardware resources of the compute layer 110, storage layer 112, and/or network layer 114 to support operation of one or more components of the virtualization layer 116. Additionally or alternatively, in some example embodiments, the virtualization layer 116 may include dedicated physical resources (e.g., physical hardware components) that may provide computing, storage, and/or network communication resources to one or more components of the virtualization layer 116.

It will be appreciated that the compute layer 110, storage layer 112, network layer 114, and virtualization layer 116 as illustrated in FIG. 1 and described above are provided by way of example, and not by way of limitation. In this regard, in some embodiments, aspects of the compute layer 110, storage layer 112, network layer 114, and virtualization layer 116 as described above may not be mandatory and thus some may be omitted in certain embodiments. Additionally, the converged infrastructure 102 of some embodiments may include further or different layers and/or components beyond those illustrated in and described with respect to FIG. 1. A block diagram of an example converged infrastructure architecture that may be implemented by the converged infrastructure 102 of some example embodiments is illustrated in and described below with respect to FIG. 2.

Physical components of the converged infrastructure 102 may be communicatively coupled with each other to support operation of the converged infrastructure 102 via direct connection and/or network communication. For example, as discussed above, in some example embodiments, the network layer 114 may provide switching and routing between physical components of the converged infrastructure.

In some embodiments at least a portion of the components of the converged infrastructure 102 may be assigned addresses, such as Internet Protocol (IP) addresses and/or other network layer addresses, via which the components may be accessed by another component internal to the converged infrastructure 102 and/or via a computing device external to the converged infrastructure 102. For example, in some example embodiments, the converged infrastructure 102 and/or one or more network addressable components thereof may be accessed by an external computing device over a network to which the converged infrastructure 102 of some embodiments may be connected.

FIG. 2 illustrates a block diagram of an architecture of another example converged infrastructure 202 in accordance with some example embodiments. The converged infrastructure 202 may, for example, be an embodiment of the converged infrastructure 102 in accordance with some example embodiments. It will be appreciated that the components and associated architecture illustrated in and described with respect to FIG. 2 are provided by way of example, and not by way of limitation. In this regard, components illustrated in FIG. 2 and described further below may not be mandatory and thus some may be omitted in certain embodiments. Additionally, some embodiments may include further or different components, beyond those illustrated in and described with respect to FIG. 2. Further, it will be appreciated that converged infrastructures within the scope of the disclosure may implement architectures other than that illustrated in and described with respect to FIG. 2. Some example embodiments provide for the generation of a cabling plan for interconnecting the components of the converged infrastructure 202 such that the components may collectively operate to provide functionality of a converged infrastructure.

The converged infrastructure 202 may include a physical infrastructure 210 configured to support a virtualized infrastructure 220. In some example embodiments, the physical infrastructure 210 may include hardware resources 214, such as servers 216-1 to 216-N (sometimes referred to as "hosts") and one or more storage array networks (SAN), such as SAN 218, which may be communicatively connected by a network (not shown). The physical infrastructure 210, including hardware resources 214 may, for example, provide an embodiment of the compute layer 110, storage layer 112, and network layer 114. For example, the servers 216 may comprise an implementation of the compute layer 110, and the SAN 218 may comprise an implementation of the storage layer 112. The hardware resources 214, including, for example, the servers 216 and SAN 218 may be communicatively connected by an embodiment of the network layer 114.

In some example embodiments, the physical infrastructure 210 may be organized into a "computing-block" based infrastructure, wherein physical infrastructure units may be characterized by repeatable units of construction having similar performance, operational characteristics, and discrete requirements of power, space, and cooling that facilitate rapid deployment, integration, and scalability. The computing-block based infrastructure may be configured to dynamically provision hardware resources based on performance demands placed on the physical infrastructure 210. One such example of physical infrastructure 210 is a Vblock System available from the VCE Company, LLC.

The physical infrastructure 210 may further include an infrastructure manager 212 configured to manage the configuration, provisioning, and policy compliance of the physical infrastructure 210. Infrastructure manager 212 may be configured to provide an interface by which provisioning of hardware resources 214 (e.g., computing, networking, storage) may be managed with policy-based automation. According to some embodiments, the infrastructure manager 212 may be included in every physical infrastructure 210 to manage the configuration, provisioning, and compliance of computing-block based infrastructure. As described in further detail below, the virtualized infrastructure 220 (or component thereof) of some example embodiments may be configured to connect to and communicate with the infrastructure manager 212 to manage and/or configure the physical infrastructure 210 to support operation of components of the virtualized infrastructure 220. One example of an infrastructure manager 212 includes EMC Ionix Unified Infrastructure Manager (UIM) available from EMC Corporation. In some embodiments, the infrastructure manager 212 may further be configured to provide network manager functionality such that the infrastructure manager 212 may be configured to configure network devices (e.g., switches, routers) and manage addressing, subnets, virtual local area networks (VLANs), and/or other network configurations that may be implemented on the converged infrastructure 202. One example of a network manager that may be included on the infrastructure manager 212 of such embodiments is a Cisco Switch, such as may be accessible via a Cisco IOS® command line interface (CLI), available from Cisco System, Inc.

The virtualized infrastructure 220 may include a virtualization environment 222 comprising one or more virtual machines (VM) 240, such as VM 240-1 to VM 240-M. Each virtual machine 240 can have an operating system (OS), one or more applications (APP) and an agent (AGENT). In some embodiments, one or more of the virtual machines 240 may be configured to connect to one or more users by a communications network, such as the Internet. The virtualized infrastructure 220 may, for example, comprise an embodiment of at least a portion of the virtualization layer 116.

The virtualization environment 222 may accordingly be configured to simulate (e.g., to virtualize) conventional components of a computing device, such as a processor, system memory, a hard disk drive, and/or the like for executing the VMs 240. For example, each VM 240 may include a virtual processor and a virtual system memory configured to execute an application. Thus, for example, the converged infrastructure 202 of some example embodiments may be configured to perform physical-to-virtual conversion of hardware resources 214 and/or other physical computing of the physical infrastructure 210 to support or host virtual machines 240 in the virtualized infrastructure 220. In this regard, components of the physical infrastructure 210 may include physical components, such as physical servers and/or other computing devices, memories, buses, networks, and/or other physical components, which may collectively support the virtualized infrastructure 220 and VMs 240.

A virtualization manager 224 of the virtualization environment 222 may be configured to establish and oversee the VMs 240. The virtualization manager 224 may be configured to dynamically allocate resources among the virtual machines 240. For example, in some embodiments, the virtualization manger 224 may be configured to communicate with the infrastructure manager 212 to manage and/or configure the physical infrastructure 210 to support operation of the virtual machines 240. The virtualization manager 224 of some example embodiments may be implemented with the VMware® vCenter® virtualized management platform available from VMware, Inc., of Palo Alto, Calif.

In some example embodiments, virtualization environment 222 may be implemented by running VMware vSphere® and/or VMware ESX®-based hypervisor technologies, available from VMware, Inc., on servers 216. However, it will be appreciated that any virtualization/hypervisor technology may be used in addition to or in lieu of VMware hypervisor technologies in accordance with various example embodiments.

Some example embodiments described further herein below may provide for generation of a cabling plan for a converged infrastructure, such as converged infrastructure 102 and/or converged infrastructure 202. In this regard, some example embodiments may be configured to determine appropriate cables (e.g., appropriate cable lengths and/or types) for interconnecting the components of a converged infrastructure and to generate a cabling plan defining the determined cables to use to interconnect the components. For example, some embodiments provide for generation of a network cabling plan for interconnecting compute layer (e.g., compute layer 110) components and storage layer (e.g., storage layer 112) components via one or more switches and/or other network layer components (e.g., one or more components that may be provided by network layer 114).

FIG. 3 illustrates a block diagram of an example computing system 300 that may be configured to generate a cabling plan in accordance with some example embodiments. The computing system 300 may be implemented on any computing device or plurality of computing devices that may be configured to implement one or more example embodiments. By way of non-limiting example, in some embodiments, the computing system 300 may be implemented on a personal computer (e.g., a desktop computer, laptop computer, or the like), a mobile computing device (e.g., a smart phone, tablet computer, personal digital assistant, or the like), on a server(s) that can be accessed over a network by another computing device, some combination thereof, or the like.

The computing system 300 may include a plurality of elements, such as cabling plan module 304, processing circuitry 310, mass storage 318, communication interface 320, and user interface 322, which may be interfaced, such as via a system bus 316. It will be appreciated that the components, devices or elements illustrated in and described with respect to FIG. 3 below may not be mandatory and thus some may be omitted in certain embodiments. Additionally, the computing system 300 of some embodiments may include further or different components, devices or elements beyond those illustrated in and described with respect to FIG. 3.

Further, while FIG. 3 illustrates an architecture including elements interfaced via the system bus 316, it will be appreciated that in some example embodiments, elements of the computing system 300 may be implemented in a distributed computing environment in which elements may be distributed across a plurality of computing devices, which may be in communication with each other, such as via a network, to provide functionality of the computing system 300. As such, in some example embodiments, a subset of the elements of the computing system 300 may be communicatively coupled via a network in addition to or in lieu of the system bus 316.

The computing system 300 of some example embodiments may implement an operating system(s), such as MS-WINDOWS™, MACINTOSH OS X™, UNIX™, LINUX™ IBM z/OS™, CISCO™ INTERNETWORK OPERATING SYSTEM™ (IOS), CISCO™ CATALYST™ OPERATING SYSTEM (CatOS), CISCO NX-OS, EMC™ ISILON OneFS™ OPERATING SYSTEM, NETAPP™ DATA ONTAP™, GOOGLE ANDROID™, APPLE IOS™, or other known operating systems. It should be appreciated, however, that in some embodiments, one or more aspects of the computing system 300 may be implemented on and/or integrated with a virtualized computing system, such as may be provided by a converged infrastructure (e.g., the converged infrastructure 102 and/or converged infrastructure 202).

In some example embodiments, the computing system 300 may include processing circuitry 310 that is configurable to perform actions in accordance with one or more example embodiments disclosed herein. In this regard, the processing circuitry 310 may be configured to perform and/or control performance of one or more functionalities for generating a cabling plan in accordance with various example embodiments. Thus, the processing circuitry 310 may be configured to perform data processing, application execution and/or other processing and management services according to one or more example embodiments.

In some example embodiments, the processing circuitry 310 may include a processor 312 and, in some embodiments, such as that illustrated in FIG. 3, may further include memory 314. The processing circuitry 310 may be in communication with (e.g., via system bus 316) and/or otherwise control the cabling plan module 304, mass storage 318, communication interface 320, and/or user interface 322.

The processor 312 may be embodied in a variety of forms. For example, the processor 312 may be embodied as various hardware processing means such as a microprocessor, a coprocessor, a general purpose processor, a controller or various other computing or processing devices including integrated circuits (e.g., a logic device), such as an ASIC (application specific integrated circuit), an FPGA (field programmable gate array), some combination thereof, or the like. Although illustrated as a single processor, it will be appreciated that the processor 312 may comprise a plurality of processors. The plurality of processors may be in operative communication with each other and may be collectively configured to perform one or more functionalities to support generation of a cabling plan in accordance with various embodiments. In some embodiments in which the computing system 300 is embodied as a plurality of computing devices, a plurality of processors, which may collectively form the processor 312, may be distributed across a plurality of computing devices that may be in operative communication with each other directly and/or via a network. In some example embodiments, the processor 312 may be configured to execute instructions that may be stored in a memory, such as the memory 314 and/or the mass storage 318 and/or that may be otherwise accessible to the processor 312. As such, whether configured by hardware or by a combination of hardware and software, the processor 312 may be capable of performing operations according to various embodiments while configured accordingly.

In embodiments including the memory 314, the memory 314 may include read only memory (ROM), random access memory (RAM), and/or the like. The mass storage 318 may include one or more memory and/or other storage devices, which may include fixed (e.g., a fixed hard disc drive, storage array, fixed flash memory device, and/or the like) and/or removable memory devices (e.g., a floppy disc drive, a removable flash memory device, an optical disc drive, and/or other removable memory device). The mass storage 318 may provide a persistent data storage device. In some example embodiments, the mass storage 318 may be configured to provide a backup storage. The mass storage 318 may include a memory device implemented locally to the computing system 300 and/or a memory device remote to the computing system 300, which may be communicatively coupled with the computing system 300, such as via a network. In some embodiments in which the computing system 300 is embodied as a plurality of computing devices, the memory 314 and/or mass storage 318 may include a plurality of memory devices, which may be distributed across a plurality of computing devices that may be in operative communication with each other directly and/or via a network to form the computing system 300.

In some embodiments, the memory 314 and/or the mass storage 318 may provide a non-transitory computer-readable storage medium that may store computer program instructions that may be executed by the processor 312. In this regard, the memory 314 and/or mass storage 318 may be configured to store information, data, applications, instructions and/or the like for enabling the computing system 300 to carry out various functions in accordance with one or more example embodiments. Applications that may be executed by the processor 312 may also be in the form of modulated electronic signals that may be accessed via a network modem or other network interface of the computing system 300.

The computing system 300 may further include a communication interface 320. The communication interface 320 may enable the computing system 300 to communicate (e.g., over a network or other communication interface) with another computing device or system. In this regard, the communication interface 320 may include one or more interface mechanisms for enabling communication with other devices and/or networks. As such, the communication interface 320 may include, for example, an antenna (or multiple antennas) and supporting hardware and/or software for enabling communications with a wireless communication network (e.g., a cellular network, wireless local area network, and/or the like) and/or a communication modem or other hardware/software for supporting communication via cable, digital subscriber line (DSL), USB, FireWire, Ethernet, one or more optical transmission technologies, and/or other wireline networking methods.

In some example embodiments, the computing system 300 may include the user interface 322. It will be appreciated, however, that in some example embodiments, one or more aspects of the user interface 322 may be omitted, and in some embodiments, the user interface 322 may be omitted entirely. The user interface 322 may be in communication with the processing circuitry 310 to receive an indication of a user input and/or to provide an audible, visual, mechanical, or other output to a user. As such, the user interface 322 may include, for example, a keyboard, a mouse, a joystick, a display, a touch screen display, a microphone, a speaker, one or more biometric input devices, and/or other input/output mechanisms.

In some embodiments including the user interface 322, the user interface 322 may be provided entirely by the computing system 300. Alternatively, in some example embodiments, aspects of the user interface 322 may be implemented by a computing device that may be in communication with the computing system 300. For example, in some embodiments in which the computing system 300 includes a server(s) providing software, a virtualized computing environment, and/or the like that can be accessed by another computing device (e.g., a mobile computing device, personal computing device, and/or the like) over a network, input/output interface mechanisms that may be used by a user to support generation of a cabling plan in accordance with various embodiments may be provided by the computing device used to access the computing system 300.

The computing system 300 may further include the cabling plan module 304. The cabling plan module 304 may be embodied as various means, such as circuitry, hardware, a computer program product comprising a computer readable medium (for example, the memory 314 and/or mass storage 318) storing computer readable program instructions executable by a processing device (for example, the processor 312), or some combination thereof. In some embodiments, the processor 312 (or the processing circuitry 310) may include, or otherwise control the cabling plan module 304. For example, in some embodiments, the processor 312 may be configured to perform functionality of the cabling plan module 304 (through execution of instructions that may be stored on and/or otherwise loaded onto the memory 314 and/or the mass storage 318.

Components of computing systems, such as the converged infrastructure 102 and/or converged infrastructure 202, in accordance with various embodiments may be interconnected to form a functioning computing system by using a set of cables to connect respective pairs of components. In this regard, one or more physical components that may be included in a computing system may each include one or more ports that may be used to connect the component to one or more further components. In this regard a port may be configured to mate or couple with an end of a cable, such as by various male-female coupling configurations. A cable may accordingly be used to connect two components of a computing system by connecting a port pair including a first port implemented on a first component and a second port implemented on a second component. The cabling plan module 304 of some example embodiments may be configured to generate a cabling plan defining respective port pairs to use to interconnect the component of the computing system and a respective cable to use to connect each port pair. In this regard, a port pair that may be designated in a cabling plan may comprise a specifically identified port on a first component (e.g., out of one or more ports that may be implemented on the first component) that should be connected to a designated port on a second component (e.g., out of one or more ports that may be implemented on the first component) via a cable so as to connect the components.

The port pairs that may be used to interconnect the components of the computing system may comprise a subset of the total available ports on the components of the computing system. In this regard, the port pairs used to connect the computing system may be selected based at least in part on the number and types of components included in the computing system. The number and types of components included in a computing system may, for example, be specified in a build specification listing the components in the computing system, an elevation plan defining mount positions within one or more racks for components of the computing system, such as that illustrated in and described further herein below with respect to FIG. 5, some combination thereof, or the like. The cabling plan module 304 may accordingly have knowledge of at least a portion of the components included in a computing system and the mount positions thereof in accordance with some example embodiments, and may use this knowledge to facilitate generation of the cabling plan in accordance with various embodiments.

The set of port pairs to be used to interconnect the components of the computing system may be selected based on set of component connection rules, system design preferences, such as may be provided by a user (e.g., via user interface 322) of a software tool for designing a computing system and/or facilitating generation of a cabling plan that may be provided in accordance with some example embodiments. For example, the ports on a switch, such as may be included in the network layer 114, that may be used to connect the switch to other components, such as one or more components of the compute layer 110 and/or one or more components of the network layer 114, may be selected (e.g., based on design preferences, component connection rules, and/or the like) based at least in part on the number of components to be connected to the switch and/or the types of components to be connected to a switch. In some example embodiments, the set of port pairs may be further selected based at least in part on device names, logical designations, and/or the like that may be assigned to components in the computing system, such as may be specified in an elevation plan, as illustrated in and described further herein below with respect to FIG. 5.

In some example embodiments, the set of port pairs that may be used to interconnect the components of a computing system may be specified by a system port map. The system port map may define the port pairs in terms of connections between port pairs. For example, FIG. 4 illustrates an example port map defining port pairs to be used for interconnecting components of a computing system that may be used to facilitate generation of a cabling plan in accordance with some example embodiments. The port map in FIG. 4 illustrates port pairs for a pair of switches, designated Switch A and Switch B, and is representative of a port map that may provide at least a portion of a system port map. The ports of each switch may be numbered with identifiers that may reference physical port locations on the physical switch component, e.g., 1-1, 1-2, 1-3, etc. A port that is to be connected to another port, such as port 1-1 of Switch A, indicated by reference 402, may include a component identifier (e.g., 6926 A-00:M0) to indicate the component and port thereof to which the switch port should be connected, thereby defining the port pairing. The component identifier may include a name of the component, logical designation of the component, type of the component, an indication of a specific port of the component that should be used to complete the connection, some combination thereof, or the like. An unused port, such as port 1-8 of Switch A, indicated by reference 404, may be blank. The port map may accordingly define port pairings that may be used to interconnect components of the computing system. As each non-switch component of some computing systems may be connected to one or more switches, the port pairings that may be used for interconnections between system components may be entirely defined through specification of a port map for each respective switch included in the system that may define each component and port(s) thereof to be connected to the switch.

In some example embodiments, a system port map, such as that illustrated in FIG. 4, may be generated from a master copy that may include each available port on each component of a computing system. The system port map may, for example, be generated from the system port map by selecting the port pairs to be used for interconnecting the system components based at least in part on a set of component connection rules; based at least in part on device names, logical designations, and/or the like that may be assigned to components in the computing system, such as may be specified in an elevation plan, as illustrated in and described further herein below with respect to FIG. 5; some combination thereof, or the like.

In some example embodiments, a cabling plan that may be generated by the cabling plan module 304 may define cable type to use to connect each port pair. In this regard, each port pair may have an associated cable type for connecting the pair of ports in the port pair. The cable type associated with a port pair may, for example, be determined based at least in part on a type of one or more of the ports in the port pair. In this regard, a port may be configured to receive and/or otherwise mate with a specific type of cable. Additionally or alternatively, the cable type associated with a port pair may be determined based at least in part on a functionality of one or both of the components to be connected. For example, a different type of cable may be used to connect a storage component to another component than may be used to connect a storage component to another component.

It will be appreciated that any of a variety of cable types may be used to connect components (i.e., to connect a pair of ports in a port pair in a computing system), and thus may be associated with a port pair, in accordance with various example embodiments. By way of non-limiting example, components of a computing system may be connected with Category 6 (Cat 6) cable, Category 5 (Cat 5) cable, Twinaxial (Twinax) cable, Serial Attached Small Computer System Interface, referred to as Serial Attached SCSI (SAS) cable, fiber cable (e.g., 8 GB fiber, 10 GB fiber, and/or other type of fiber cable), some combination thereof, and/or other cable type(s) that may be used to connect components of a computing system.

In some example embodiments, the cable type that may be associated with a port pair may be defined in a port map. For example, referring again to FIG. 4, port 1-1 of Switch A, identified by reference 402, is shaded with a first type of shading indicative that a first cable type, such as CAT 6 cable, should be used to connect the ports in the port pair. Port 2-1, of Switch A, and Port 2-1 of Switch B, each identified by references 406, which comprise a port pair in the example of FIG. 4 are shaded with a second type of shading indicative that a second cable type, such as Twinax cable, should be used to connect the ports in the port pair. In the example of FIG. 4, widely spaced forward slash hashing is used to represent the first type of shading and more closely spaced backslash hashing is used to represent the second type of shading. It will be appreciated, however, that any of a variety of shadings, color fills, some combination thereof, or the like that may be keyed to cable types may be substituted for the example shading types illustrated in FIG. 4.

A cabling plan that may be generated by the cabling plan module 304 in accordance with various example embodiments may additionally or alternatively specify a cable length to use to connect the pair of ports in a port pair. The cabling plan module 304 may be configured to determine the cable length to use to connect the pair of ports in a port pair based at least in part on an elevation plan for the computing system. The elevation plan may define the mount positions for at least a portion of components of the computing system (e.g., within one or more racks). In this regard, the elevation plan may define the relative positions of components and, given knowledge of port pairs used to interconnect the components, such as may be determined from a system port map (e.g., the example port map of FIG. 4), the cabling plan module 304 may use the elevation plan to determine the length of cable needed to connect the ports in a given port pair.

A rack that may be used to house components of a computing system can be any rack, such as a closed cabinet rack (e.g., a rack enclosure or cabinet), an open frame rack, or other structure comprising a plurality of mount positions (e.g., slots, mounts, and/or mechanism that can be used to support a component in a mount position on a rack). Each mount position may have a uniform vertical dimension. For example, in some embodiments, a mount position may be defined as a rack unit (RU) of space, which may, for example, have a vertical height of 1.75 inches (44.45 millimeters). It will be appreciated, however, that other dimensions that may be used for mount positions within a rack are contemplated within the scope of the disclosure.

A component may be mounted in a mount position of a rack. An elevation plan in accordance with various example embodiments may specify a mount position in which a component is to be mounted. A vertical dimension of a component may require one or more mount positions (e.g., rack units) of space within a rack such that a component defined to be mounted in a given mount position may occupy multiple mount positions within a rack. The elevation plan may accordingly indicate the mount position(s) within a rack that are occupied by a given component.

A rack that may be used to house components of a computing system may have any of a variety of sizes. By way of non-limiting example, racks having 42 mount positions (e.g., 42 RUs of vertical racking space) may be used in some example embodiments. However, it will be appreciated that racks having other dimensions are contemplated within the scope of the disclosure and examples described herein with respect to racks having 42 mount positions are provided by way of example and not by way of limitation. The cabling plan module 304 may accordingly take the size of a rack into account when determining the length of cable to use to connect the pair of ports in a given port pair.

FIG. 5 illustrates an example elevation plan that may be used to facilitate generation of a cabling plan in accordance with some example embodiments. The elevation plan in the example of FIG. 5 is for a computing system including at least two racks, including rack 1 502 and rack 2 504. Each of rack 1 502 and rack 504 is illustrated by way of example as a 42 RU rack, with respective rack units in each rack numbered RU1-RU42. Mount positions (e.g., RUs) in which a component is mounted include an indication of the component identity. A logical identifier of the component, such as A, B, C, etc. may also be included in the elevation plan. If a component occupies multiple mount positions in the rack, the mount positions occupied by the component may be grouped into a single cell. In the example of FIG. 5, open mount positions that are not used for mounting a component are designated by shading.

It will be appreciated that the example elevation plan of FIG. 5 is provided by way of illustrative example, and not by way of limitation as to the format of an elevation plan that may be used by the cabling plan module 304. In this regard, the elevation plan that may be used by the cabling plan module 304 may take the form of a table or spreadsheet, such as illustrated in FIG. 5, a text-based list defining associations between components and their respective mount positions, a database, and/or other format that may be used to define mount positions for components within a computing system.

The elevation plan, such as that illustrated in FIG. 5, that may be used to facilitate generation of a cabling plan may, for example, be specified, uploaded, and/or defined by a user via a user interface that may be provided by a software tool that may be provided in accordance with some example embodiments. Additionally or alternatively, in some example embodiments, the elevation plan may be generated based on a build specification defining components to be included in the computing system as a prelude to generating the cabling plan as part of a system design process.

In order to determine the cable length for a port pair, the cabling plan module 304 may determine the mount position for a first component on which a first port in the port pair is implemented and the mount position for a second component on which a second port in the port pair is implemented. The cabling plan module 304 may determine a distance between the mount positions.

The distance between the mount positions may, for example, comprise a vertical distance. For example, with reference to FIG. 5, the component mounted in RUs 14-15 of rack 1 502 may be connected to the component mounted in RUs 1-6 of rack 1 502. Based on component information that may define the location of ports on respective components, the cabling plan module 304 may know the location of the ports on the components and may determine the vertical distance between the ports, such as in terms of rack units, feet, inches, meters, centimeters, and/or other unit dimension that may be used to specify length. The cabling plan module 304 may accordingly determine a cable length satisfying the vertical distance between ports that may be determined from the elevation plan.

In some example embodiments, the cabling plan module 304 may be further configured to determine one or more horizontal distances that a cable connecting a pair of ports in a port pair may travel. For example, a cable may be routed horizontally within a rack unit of space from a port implemented on a first component to a vertical routing position at which the cable may be routed vertically from the rack unit to another rack unit at which the second component is mounted and on which the second port in the port pair may be implemented. The vertical routing position may, for example, be a side of a rack down which cables may be routed, a dedicated cable channel that may be included in a rack for vertically routing cables within the rack, and/or other structure that may be used to route cables within a rack.

The cabling plan module 304 may have access to component dimension information that may include port placement information such that the cabling plan module 304 may know the location of a port on a component and may use the port placement information to determine a horizontal distance that a cable coupled to the port may be routed to a vertical routing position. Thus, the cable length that may be used to connect a pair of ports used to connect two components mounted in the same rack may be determined based at least in part on a pair of horizontal distances (e.g., one horizontal distance for each port) and a vertical distance between the mount positions of the components.

Some racks may include multiple vertical routing positions that may be used to vertically route cables (e.g., two sides, multiple dedicated cable channels, and/or the like). As such, it is possible in some implementations that there may be a choice of horizontal routing directions (e.g., right or left) from a port to a vertical routing position. In some embodiments, the cabling plan module 304 may choose a horizontal routing direction yielding the shortest path when there are multiple vertical routing positions that may be used. However, in some example embodiments, a port may have a predefined associated horizontal routing direction that is to be used regardless of whether routing a cable in that direction yields the shortest possible horizontal distance to a vertical routing position. In embodiments in which a port may have a predefined associated horizontal routing direction, the horizontal routing direction may be selected to provide a cleaner appearance for cables routed within a cabinet. A horizontal routing direction that may be associated with a port may be stored in a data structure such that given a port identity, the cabling plan module 304 may determine the associated horizontal routing direction to use when determining the cable length needed for a given port pair.

In cases where a port pair may include a port implemented on a component mounted in a first rack and a port implemented on a component mounted in a second rack, the cabling plan module 304 may be configured to determine a cable length for the port pair based at least in part on a distance between the racks. For example, the spacing between the locations at which the racks may be positioned once the computing system is fully assembled may be defined and used by the cabling plan module 304 to calculate a needed cable length. In some cases in which a cable connecting the ports in a port pair may connect components mounted in different racks, the cable length may be determined based at least in part on the distance between the racks in combination with an internal routing distance representative of a distance over which a cable is routed from a port (e.g., horizontally and/or vertically) to a location on a rack at which cable may be routed externally to another rack for each of the racks.

The cabling plan that may be generated by the cabling plan module 304 may be specified in any format. For example, in some embodiments in which a port map may be used to facilitate generation of the cabling plan, an indication of the appropriate cable to be used may be added to each designated port pair of the port map. As a further example, a table, list, and/or other structure may identify each of a plurality of individual ports and/or port pairs that may be used to interconnect components of a computing system and may reference the associated cable to use to connect the port/port pair. The ports/port pairs in the cabling plan may, for example, be grouped by component. Thus, for example, an individual building a computing system may reference the cabling plan and determine, for a given component, a second component to which the component is to be connected, a respective port pair to use for the connection, and a cable (e.g., cable type and/or length thereof) to use to connect the ports in the port pair. A non-limiting example of a cabling plan that may be generated in accordance with some example embodiments is illustrated in and described below with respect to FIG. 9.

In some example embodiments, the cabling plan module 304 may be configured to generate an electronic output file specifying the cabling plan. In this regard, a cabling plan, such as that illustrated in and described below with respect to FIG. 9, may be specified in an electronic file format, such as spreadsheet format (e.g., .xls or the like), a document format (e.g., .doc or the like), a database file, and/or the like. In such example embodiments, the electronic output file including the cabling plan may be stored in a memory, such as memory 314, mass storage 318, and/or the like. In some embodiments, the electronic output file that may include the cabling plan may be readable by and/or exportable to a software program, such as to support further system design tasks, system build tasks, and/or system diagnostic/repair tasks for a completed system.

In some example embodiments, the cabling plan module 304 may be configured to generate a graphical user interface including the cable plan, which may be displayed to a user. For example, the cabling plan may be displayed on a display that may be provided by the user interface 322.

In some example embodiments, generation of the cabling plan may further include the cabling plan module 304 generating a set of cable labels. In such embodiments, the cable labels may be printed and used to label cable connections (e.g., with information indicative of the components and/or port pair connected by a cable) when cabling a computing system in accordance with the cabling plan.

FIG. 6 illustrates a flowchart according to an example method for generating a cabling plan for a computing system in accordance with some example embodiments. One or more elements of the computing system 300, such as the cabling plan module 304, processing circuitry 310, processor 312, memory 314, system bus 316, mass storage 318, communication interface 320, and/or the user interface 322 may, for example, provide means for performing one or more of the operations illustrated in and described with respect to FIG. 6 in accordance with some example embodiments.

Operation 600 may include accessing an elevation plan for a computing system. The elevation plan may define a mount position for each of a plurality of components of the computing system. The elevation plan may, for example, be specified by a user. As another example, the elevation plan may be generated based at least in part on a build specification identifying components to be included in the computing system and may then be used to facilitate generation of the cabling plan.

Operation 610 may include determining one or more port pairs to be used for interconnecting the plurality of components of the computing system. Each port pair may accordingly include a pair of ports that may be used to connect two components of the plurality of components.

Operation 620 may include determining, for each port pair of the one or more port pairs, a cable length to use to connect the pair of ports in the port pair. The cable length may be determined based at least in part on the mount positions defined by the elevation plan for the two components. For example a vertical distance may be determined between the component mount positions and may be used to determine the appropriate cable length. Additionally or alternatively, a horizontal distance may be determined for each port (e.g., a distance between the port and a vertical routing position) and may be considered when determining the cable length. An example method that may be used to perform operation 620 is illustrated in and described herein below with respect to FIG. 7.

It will be appreciated that operations 610 and 620 may not include determining every pair of ports that may be used for interconnecting components and/or determining a length on the basis of the elevation plan for every pair of ports that may be used for interconnecting components. For example, some components may only use a select cable type and/or length thereof for connections and thus there may not be a need to determine a cable length on the basis of the elevation plan, as a default length may be used regardless of relative positioning of the components. As such, it will be appreciated that operation 610 and/or operation 620 may be applied to a subset of the full set of port pairs that may be used for interconnecting system components.

Operation 630 may include generating a cabling plan. The cabling plan may define, for each port pair of the one or more port pairs, the cable length to use to connect the pair of ports in the port pair. Where multiple cable types may be used within a computing system, a cable type may also be specified by the cabling plan for each port pair of the one or more port pairs. The cabling plan may, for example, be a network cabling plan that may define a plan for connecting network cabling, such as may be used to interconnect compute layer (e.g., compute layer 110) components and storage layer (e.g., storage layer 112) components via one or more switches and/or other network layer components (e.g., one or more components that may be provided by network layer 114).

FIG. 7 illustrates a flowchart according to an example method for determining a length of cable needed to connect a port pair in accordance with some example embodiments. In this regard, FIG. 7 illustrates an example method that may be used to facilitate performance of operation 620 as described above. One or more elements of the computing system 300, such as the cabling plan module 304, processing circuitry 310, processor 312, memory 314, system bus 316, mass storage 318, communication interface 320, and/or the user interface 322 may, for example, provide means for performing one or more of the operations illustrated in and described with respect to FIG. 7 in accordance with some example embodiments.

Operation 700 may include determining, based at least in part on a distance between mount positions defined by the elevation plan, a vertical distance between a first component and a second component to be connected by the port pair. Operation 710 may include determining a first horizontal distance between a first port in the port pair (i.e., a port implemented on the first component) and a vertical routing position that may be used to route cable vertically from the mount position of the first component toward the mount position of the second component. Operation 720 may include determining a second horizontal distance between the second port in the port pair (i.e., a port implemented on the second component) and a vertical routing position (e.g., a vertical routing position at which cabling may arrive from the first component).

Operation 730 may include determining the cable length to use to connect the first and second ports in the port pair based at least in part on the vertical distance, the first horizontal distance, and the second horizontal distance. In this regard, the vertical distance, the first horizontal distance, and the second horizontal distance may be summed. In some example embodiments, a safety margin (e.g., an additional distance) may be added to provide some slack and flexibility in the cable length when connecting the two components.

In some example embodiments, operation 620 and/or the method of FIG. 7 may include determining a minimum cable length needed to connect two components based on their respective mount positions. The final cable length that may be determined in operation 620 and included in the cabling plan may be different from this minimum length. For example, in some embodiments, there may be a plurality of available cable lengths of a given cable type, and the shortest available cable length satisfying the minimum cable length may be selected and indicated in the cabling plan. Thus, rather than custom cutting/forming a cable for each connection, an appropriate stock cable may be selected. It will be appreciated, however, that in some embodiments and/or for some cables, a custom cable may be cut/formed for a given port pair based on a minimum cable length needed to connect the ports.

FIG. 8 illustrates a flowchart according to an example method for determining a length of cable to use to connect a port pair in accordance with some example embodiments in which a shortest available cable length satisfying a minimum required cable length may be selected. In this regard, FIG. 8 illustrates a method that may be used to facilitate performance of operation 620 as described above.

Operation 800 may include determining a minimum cable length needed to connect the pair of ports in the port pair. Operation 800 may, for example, be performed using the method of FIG. 7. In this regard, the minimum cable length may be defined by a vertical distance between mount positions for components in the same rack and, in some cases, a horizontal routing distance(s) between a port and a vertical routing position. For components mounted in separate racks, the spacing between racks may additionally or alternatively be considered when determining the minimum cable length.

Operation 810 may include determining a shortest cable length from a plurality of available cable lengths satisfying the minimum cable length. Thus, for example, if the minimum cable length needed for a connection is 4 feet and the appropriate cable type is available in 3 foot and 5 foot lengths, the 5 foot cable may be selected. The cable length that may be determined in operation 810 for a port pair may be the cable length included in the cabling plan for the port pair.

FIG. 9 illustrates a portion of an example cabling plan that may be generated in accordance with some example embodiments. In this regard, the cabling plan of FIG. 9 may, for example, be generated attendant to performance of operation 630 in accordance with some example embodiments. It will be appreciated that the example cabling plan of FIG. 9 is provided by way of example, and not by way of limitation. In this regard, other cabling plan formats are contemplated within the scope of the disclosure. Moreover, a cabling plan that may be generated in accordance with some example embodiments may omit some of the information contained in the example of FIG. 9 and/or may include alternative information compared to that contained in the example of FIG. 9. Further, some cabling plans may include additional beyond that included in the example of FIG. 9.

With reference to FIG. 9, the cabling plan may be organized into a table, with rows representing respective connections and the columns organizing information describing the connection parameters. For example, column 902 may define the cable type (e.g., CAT 5, CAT 6, Twinax, Fiber, SAS, or the like) to use for the connection. Column 904 may define the length of cable (e.g., in feet, meters, or other unit of measure) to use for the connection. Column 906 may include an identifier (ID) for the cable. The cable ID may, for example, be in the form of a manufacturer part number, a part stocking number, such as a stock keeping unit (SKU) that may be used for inventory management, and/or the like. In some example embodiments, if the cable ID conveys both cable type and cable length information, the data in columns 902 and 904 may be omitted. Alternatively, the cable ID information may be omitted and the data in columns 902 and 904 may be used to uniquely identify the appropriate cable to use for a connection. However, as illustrated in some example embodiments, each of a cable type, cable length, and cable ID (e.g., data contained in columns 902, 904, and 906) may be used to identify the appropriate cable to use for a connection.

Columns 908 and 910 may identify the port pair that is to be connected for a given connection. For example, column 908 may identify a first/source port for a connection, and column 910 may identify a second/destination port for the connection. Accordingly, data in columns 908 and 910 may identify the port pair to be connected by the cable specified in columns 902-906.

It will be understood that each block of the flowcharts in FIGS. 6-8, and combinations of blocks in the flowcharts, may be implemented by various means, such as hardware and/or a computer program product comprising one or more computer readable mediums having computer readable program instructions stored thereon. For example, one or more of the procedures described herein may be embodied by computer program instructions of a computer program product. In this regard, the computer program product(s) which may embody the procedures described herein may be stored by one or more memory devices (e.g., memory 314, mass storage 318, and/or other memory device) of a computing device and executed by a processor in the computing device (e.g., processor 312 and/or other processor). In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer readable memories on which the computer program instructions may be stored such that the one or more computer readable memories can cause a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s). Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

Moreover, it will be appreciated that the ordering of blocks and corresponding method operations within the flowcharts is provided by way of non-limiting example in order to describe operations that may be performed in accordance some example embodiments. In this regard, it will be appreciated that the ordering of blocks and corresponding method operations illustrated in the flowcharts is non-limiting, such that the ordering of two or more block illustrated in and described with respect to the flowchart may be changed and/or method operations associated with two or more blocks may be at least partially performed in parallel in accordance with some example embodiments. Further, in some embodiments, one or more blocks and corresponding method operations illustrated in and described with respect to the flowcharts may be optional, and may be omitted.

It will be further appreciated that operations illustrated in and described with respect to the flowcharts may be automatically performed without human intervention. In this regard, various example embodiments support automated generation of a cabling plan such that a cabling plan may be generated based on a set of one or more inputs without human intervention.

Functions in accordance with the above described embodiments may be carried out in many ways. In this regard, any suitable means for carrying out each of the functions described above may be employed to carry out various embodiments. In some embodiments, a suitably configured processor (e.g., processor 312) may provide all or a portion of the elements. In other embodiments, all or a portion of the elements may be configured by and operate under control of a computer program product. The computer program product for performing the methods of various embodiments of includes at least one computer readable storage medium having computer readable program code stored thereon. The computer readable medium (or media) may, for example, be embodied as and/or otherwise include the memory 314 and/or mass storage 318. However, it will be appreciated that a computer program product in accordance with various example embodiments may include any data storage device (e.g., a non-transitory computer readable storage medium) that can store data, which can be thereafter read by a computer system. Examples of the computer readable storage media include hard drives, network attached storage (NAS), read-only memory, random-access memory, one or more digital versatile disc (DVDs), one or more compact disc read only memories (CD-ROMs), one or more compact disc-recordable discs (CD-Rs), one or more compact disc-rewritable discs (CD-RWs), one or more Blu-Ray discs, magnetic tapes, flash memory, some combination thereof, and/or other optical and non-optical data storage devices. Some example embodiments may additionally or alternatively use computer readable storage media distributed over a network coupled computer system such that the computer readable code may be stored and executed in a distributed fashion.

Embodiments utilizing a computer program product and/or otherwise employing various computer-implemented operations may employ operations involving data stored in computer systems. These operations include those requiring physical manipulation of physical quantities. In some instances, though not all, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. Moreover, it will be appreciated that a non-transitory computer readable storage medium storing program instructions configured to carry out operations in accordance with one or more embodiments constitutes an article of manufacture.

The disclosed embodiments also relate to a device or an apparatus for performing these operations. The apparatus may be specially constructed to perform a particular embodiment(s), or the apparatus can be a general-purpose computer selectively activated or configured by a computer program stored in and/or otherwise accessible by the computer such that the general-purpose computer is configured to perform operations in accordance with one or more embodiments.

Embodiments described herein may be practiced with various computer system configurations including blade devices, cloud systems, converged infrastructure systems, rack mounted servers, switches, storage environments, hand-held devices, tablets, microprocessor systems, microprocessor-based or programmable consumer electronics, minicomputers, mainframe computers and the like. Some embodiments may also be practiced in distributed computing environments where tasks are performed by remote processing devices that are linked through one or more networks, such as one or more wireline networks and/or one or more wireless networks.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

The invention claimed is:

1. A method for building a computing system, the method comprising: generating a cabling plan for the computing system including a plurality of components within one or more racks, generating the cabling plan including processing circuitry automatically at least: accessing an elevation plan defining a respective mount position for each of the plurality of components of the computing system within the one or more racks; determining one or more port pairs to be used for interconnecting the plurality of components, wherein each port pair of the one or more port pairs comprises a pair of ports for connecting two components of the plurality of components; determining, for each port pair of the one or more port pairs, a cable length to use to connect the pair of ports in the port pair, wherein the cable length is determined based at least in part on mount positions defined by the elevation plan for the two components connected by the port pair, and wherein for each of at least one port pair of the one or more port pairs, determining the cable length includes: determining a horizontal distance between a position of a first port in the port pair and a vertical routing position at which a cable connecting the first port and a second port in the port pair will be routed vertically from a mount position of a component on which the first port is implemented toward a mount position of a component on which the second port is implemented; and determining the cable length to use to connect the pair of ports in the port pair further based on the horizontal distance; and generating the cabling plan defining, for each port pair of the one or more port pairs, the cable length to use to connect the pair of ports in the port pair; and building the computing system by a user, according to the cabling plan, including using at least a cable with the cable length to connect the pair of ports in the port pair; wherein determining the cable length for each port pair of the one or more port pairs comprises: determining, based at least in part on mount positions defined by the elevation plan for the two components connected by the port pair, a minimum cable length needed to connect the pair of ports in the port pair; and determining a shortest cable length from a plurality of available cable lengths satisfying the minimum cable length.

2. The method of claim 1, wherein the computing system is a converged infrastructure comprising one or more compute layer components, one or more storage layer components, and one or more network layer components.

3. The method of claim 1, wherein:
each port pair of the one or more port pairs has an associated cable type for connecting the pair of ports in the port pair; and
the cabling plan further defines, for each port pair of the one or more port pairs, the associated cable type for the port pair.

4. The method of claim 3, wherein the associated cable type is selected from the group consisting of Category 6 (Cat 6) cable, Category 5 (Cat 5) cable, Twinaxial (Twinax) cable, and Serial Attached Small Computer System Interface (SAS) cable.

5. The method of claim 1, wherein the first port has a predefined association with a horizontal routing direction specifying a horizontal direction in which a cable connected to the first port should be routed, and wherein determining the horizontal distance comprises determining the horizontal distance in accordance with the horizontal routing direction.

6. The method of claim 1, wherein the horizontal distance comprises one or more of:
a horizontal distance between the position of the first port and a side of a rack including the mount position of the component on which the first port is implemented; or
a horizontal distance between the position of the first port and a location of a cable channel usable for vertically routing cables within the rack including the mount position of the component on which the first port is implemented.

* * * * *